United States Patent
Loesch et al.

(10) Patent No.: US 12,146,941 B2
(45) Date of Patent: Nov. 19, 2024

(54) MIMO RADAR SENSOR INCLUDING SYNCHRONIZED HIGH-FREQUENCY CHIPS

(71) Applicant: Robert Bosch GmbH, Stuttgart (DE)

(72) Inventors: Benedikt Loesch, Stuttgart (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 382 days.

(21) Appl. No.: 17/648,328

(22) Filed: Jan. 19, 2022

(65) Prior Publication Data

US 2022/0229167 A1  Jul. 21, 2022

(30) Foreign Application Priority Data

Jan. 21, 2021  (DE) .................. 10 2021 200 520.9

(51) Int. Cl.
*G01S 13/42* (2006.01)
*G01S 13/58* (2006.01)
*G01S 13/931* (2020.01)

(52) U.S. Cl.
CPC .............. *G01S 13/42* (2013.01); *G01S 13/58* (2013.01); *G01S 13/931* (2013.01)

(58) Field of Classification Search
CPC . G01S 7/40; G01S 13/42; G01S 13/58; G01S 13/931
See application file for complete search history.

(56) References Cited

U.S. PATENT DOCUMENTS

| | | | | |
|---|---|---|---|---|
| 5,717,399 A | * | 2/1998 | Urabe | H01Q 3/24 342/87 |
| 5,877,726 A | * | 3/1999 | Kudoh | H01Q 3/24 342/175 |
| 5,940,011 A | * | 8/1999 | Agravante | H01Q 1/3233 340/901 |

(Continued)

FOREIGN PATENT DOCUMENTS

| | | |
|---|---|---|
| DE | 102014208899 A1 | 11/2015 |
| WO | 2019170277 A1 | 9/2019 |

OTHER PUBLICATIONS

Schmid et al., "Motion Compensation and Efficient Array Design for TDMA FMCW MIMO Radar Systems," in 6th European Conference On Antennas and Propagation (EUCAP), 2012, pp. 1746-1750.

*Primary Examiner* — Peter M Bythrow
(74) *Attorney, Agent, or Firm* — NORTON ROSE FULBRIGHT US LLP; Gerard A. Messina

(57) ABSTRACT

A MIMO radar sensor including an array of transmitting antenna elements and receiving antenna elements that are offset relative to one another in a predefined direction, and including at least two electronic chips that are associated with different selections of the transmitting antenna elements and receiving antenna elements. At least one receiving antenna element is connectable to both chips, and the array includes at least one configuration of antenna elements that is made up of a transmitting antenna element with which the chip is associated, a receiving antenna element with which the chip is associated, a transmitting antenna element with which the chip is associated, and a receiving antenna element with which the chip is associated, and in which configuration the offset between the transmitting antenna elements matches the offset between the receiving antenna elements.

8 Claims, 1 Drawing Sheet

(56) References Cited

U.S. PATENT DOCUMENTS

| | | | | |
|---|---|---|---|---|
| 6,130,640 | A * | 10/2000 | Uematsu | G01S 7/032 |
| | | | | 342/175 |
| 6,750,810 | B2 * | 6/2004 | Shinoda | H01Q 25/002 |
| | | | | 342/149 |
| 9,689,967 | B1 * | 6/2017 | Stark | G01S 7/0233 |
| 9,733,340 | B2 * | 8/2017 | Rao | G01S 13/931 |
| 10,725,150 | B2 * | 7/2020 | Trotta | G01S 7/354 |
| 11,187,795 | B2 * | 11/2021 | Iwasa | G01S 13/003 |
| 11,275,145 | B2 * | 3/2022 | Aoki | H01Q 21/06 |
| 11,448,725 | B2 * | 9/2022 | Iwasa | G01S 13/0218 |
| 11,543,518 | B2 * | 1/2023 | Kim | G01S 7/35 |
| 11,822,006 | B2 * | 11/2023 | Wintermantel | G01S 7/4008 |
| 2011/0080314 | A1 * | 4/2011 | Wintermantel | H01Q 9/0407 |
| | | | | 342/147 |
| 2012/0288033 | A1 * | 11/2012 | Stirling-Gallacher | G01S 7/03 |
| | | | | 375/322 |
| 2016/0003938 | A1 * | 1/2016 | Gazit | G01S 13/02 |
| | | | | 342/81 |
| 2016/0285172 | A1 * | 9/2016 | Kishigami | G01S 7/0234 |
| 2017/0153316 | A1 * | 6/2017 | Wintermantel | H03M 7/24 |
| 2017/0212213 | A1 * | 7/2017 | Kishigami | G01S 13/284 |
| 2017/0307744 | A1 * | 10/2017 | Loesch | H01Q 21/296 |
| 2017/0322295 | A1 * | 11/2017 | Loesch | G01S 13/931 |
| 2018/0149735 | A1 * | 5/2018 | Lim | G01S 13/345 |
| 2018/0151961 | A1 * | 5/2018 | Lim | H04B 7/043 |
| 2018/0172813 | A1 * | 6/2018 | Rao | G01S 13/343 |
| 2019/0310359 | A1 * | 10/2019 | Lee | G01S 13/0218 |
| 2019/0346544 | A1 * | 11/2019 | Hammes | G01S 13/931 |
| 2019/0386665 | A1 * | 12/2019 | Shalita | H03L 7/081 |
| 2020/0103515 | A1 * | 4/2020 | Kishigami | G01S 13/284 |
| 2021/0013596 | A1 * | 1/2021 | Loesch | H01Q 1/38 |
| 2021/0311164 | A1 * | 10/2021 | Schmalzl | G01S 13/584 |
| 2022/0065986 | A1 * | 3/2022 | Vaucher | G01S 7/4017 |
| 2022/0113399 | A1 * | 4/2022 | Li | G01S 13/931 |
| 2022/0120847 | A1 * | 4/2022 | Zhang | G01S 7/032 |
| 2022/0163623 | A1 * | 5/2022 | Kishigami | H01Q 21/065 |

\* cited by examiner

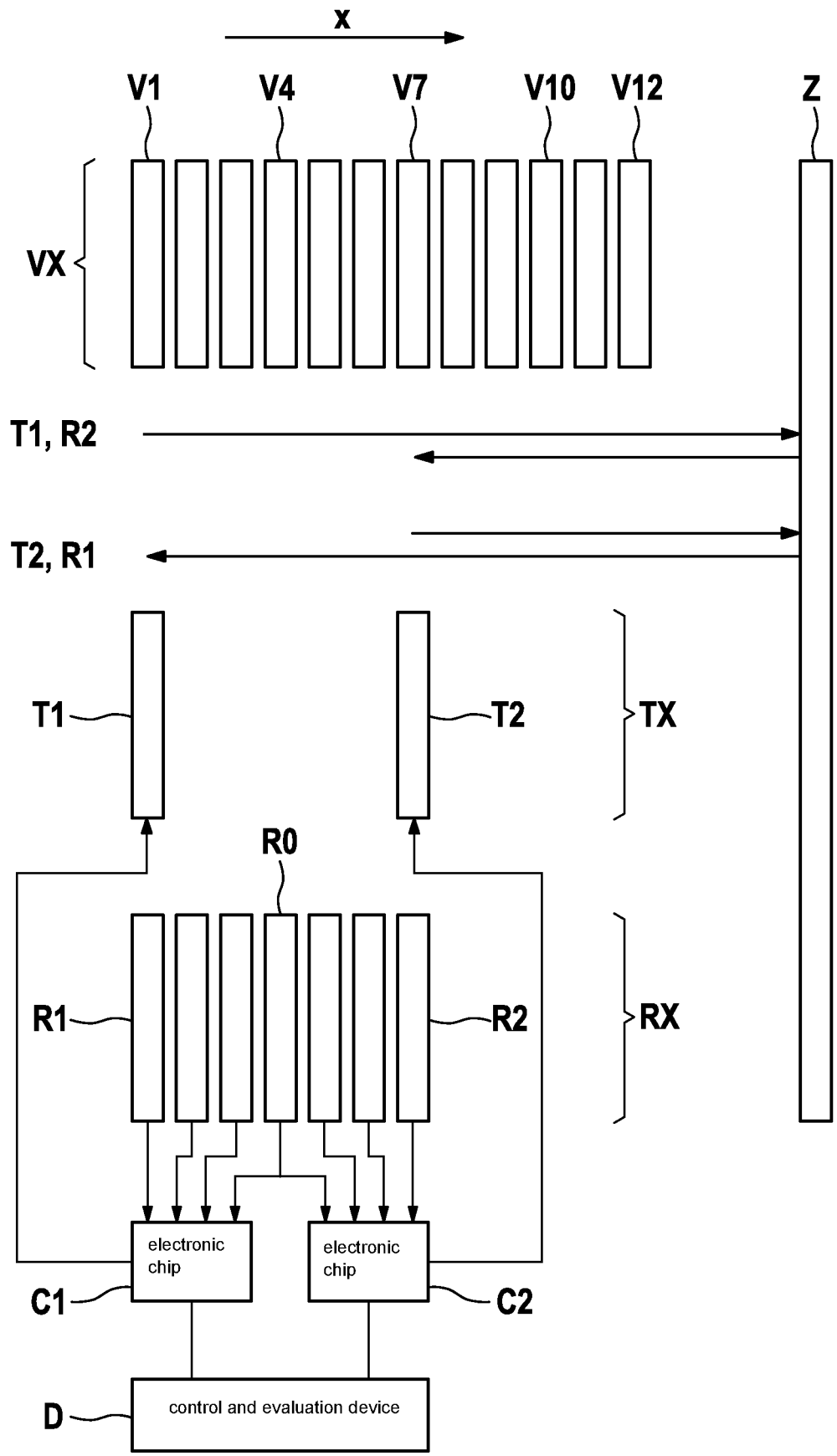

MIMO RADAR SENSOR INCLUDING SYNCHRONIZED HIGH-FREQUENCY CHIPS

CROSS REFERENCE

The present application claims the benefit under 35 U.S.C. § 119 of German Patent Application No. DE 10 2021 200 520.9 filed on Jan. 21, 2021, which is expressly incorporated herein by reference in its entirety.

FIELD

The present invention relates to a MIMO radar sensor including an array of transmitting antenna elements and receiving antenna elements that are offset relative to one another in a predefined direction, and including at least two electronic chips C1 and C2 that are associated with different selections of the transmitting antenna elements and receiving antenna elements.

In particular, the present invention relates to a radar sensor for motor vehicles.

BACKGROUND INFORMATION

In surroundings monitoring in driver assistance systems for motor vehicles, in addition to the distance and the relative velocity of the located radar targets, the azimuth angle and the elevation angle of these targets are important. For example, information about the azimuth angle is necessary so that the object may be associated with a certain lane of the roadway. Information about the elevation angle allows an estimation of whether the object may be traveled over or traveled under, or represents a relevant obstacle. The azimuth angle and elevation angle of the targets may be ascertained from amplitude and/or phase differences of the signals of the receiving antenna elements. According to the multiple input multiple output (MIMO) principle, the receiving antenna elements are combined with various transmitting antenna elements, for example in time multiplex or in frequency multiplex. Each combination corresponds to a virtual antenna element whose offset with respect to another virtual antenna element is additively made up of the offsets of the involved receiving antenna elements and of the involved transmitting antenna elements. The virtual array may have a larger aperture than the real array, and thus allows a higher angular resolution.

When the array includes a very large number of transmitting antenna elements and receiving antenna elements, a correspondingly larger virtual array may be generated and a correspondingly greater angular separation capability may be achieved. However, using a single integrated electronic component, it may then no longer be possible to manage the feeding of the transmission signals into the plurality of transmitting antenna elements and the evaluation of the reception signals of the numerous receiving antenna elements. The high-frequency portion of the radar sensor must then include multiple integrated units, for example monolithic microwave integrated circuits (MMICs), which are referred to here as "chips" for short. In the ideal case, these chips should operate in a perfectly synchronized manner, so that the phase differences between the reception signals are determined solely by the different propagation times of the radar signals, and thus by the angle to be measured, and are not a function of phase differences between the various chips. However, phase differences occur between the various chips in practice, for example due to manufacturing tolerances or also due to temperature differences from chip to chip and/or differently proceeding aging processes. These phase differences are thus generally not constant over time, and therefore cannot be eliminated by a one-time calibration of the chips.

A method for online calibration of the phases between multiple MMICs is described in PCT Patent Application No. WO 2019/170277 A1, in which the temperatures of the chips are measured using temperature sensors, and the phases are then corrected based on a model of the temperature dependency of the chips.

German Patent Application No. DE 10 2014 208 899 A1 describes a method for online calibration based on radar measured data and deviations from measured antenna diagrams.

C. Schmid et al., "Motion Compensation and Efficient Array Design for TDMA FMCW MIMO Radar Systems," in 6th European Conference on Antennas and Propagation (EUCAP), March 2012, pp. 1746-1750, describe an antenna system with overlapping virtual channels, which allows a phase shift between two transmitting antennas of the same MMIC to be compensated for based on a measured relative velocity.

SUMMARY

An object of the present invention is to provide a MIMO radar sensor for which it is possible to directly measure the phase deviations between the chips during use of the radar sensor.

This object may achieved according to an example embodiment of the present invention in that at least one receiving antenna element R0 is connectable to both chips C1 and C2, and the array includes at least one configuration of antenna elements that is made up of a transmitting antenna element T1 with which chip C1 is associated, a receiving antenna element R1 with which chip C1 is associated, a transmitting antenna element T2 with which chip C2 is associated, and a receiving antenna element R2 with which chip C2 is associated, and in which configuration the offset between transmitting antenna elements T1 and T2 matches the offset between receiving antenna elements R1 and R2.

In the present context, the statement that the chip is "associated" with a transmitting antenna element or receiving antenna element means that the radar sensor may be operated in such a way that the transmitting antenna element is fed by the chip, i.e., the chip processes the reception signal of the receiving antenna element. The phase difference between the chips is made up of a transmission channel portion DELTA_TX and a reception channel portion DELTA_RX. These two portions result due to different signal paths in the chips, as a function of whether for the virtual antenna element in question, the chip at that moment is transmitting, receiving, or transmitting and receiving.

Since according to an example embodiment of the present invention at least one antenna element R0 is connectable to both chips C1 and C2, reception channel portion DELTA_RX may be measured by comparing the phases of the reception signals, obtained in the two chips, to one another in a state in which only one of the chips, for example chip C1, transmits. Since the transmission channel portion is the same for both signals, the measured phase difference must be reception channel portion DELTA_RX.

Since the offset between transmitting antenna elements T1 and T2 matches the offset between receiving antenna elements R1 and R2, the configuration of the four antenna elements T1, R1, T2, R2 is redundant, in that the combination of transmitting antenna element T1 with receiving antenna element R2 results in the same virtual antenna element as the combination of transmitting antenna element T2 with receiving antenna element R1. If there is no phase difference from chip to chip, the same phase should be obtained in both combinations, regardless of the locating angle of the target. If the phases actually measured in these two combinations are now compared to one another, overall phase difference DELTA_TX+DELTA_RX between the chips is obtained. Since reception channel portion DELTA_RX and the sum of the two portions are thus known, transmission channel portion DELTA_TX may also be computed. Using known portions DELTA_RX and DELTA_TX, for each virtual antenna element, i.e., for each combination of transmitting antenna elements and receiving antenna elements, the phase difference may then be compensated for, regardless of which of the two chips in this combination transmits, and which chip processes, the received signal.

One exemplary embodiment if the present invention is explained in greater detail below with reference to the FIGURE.

BRIEF DESCRIPTION OF THE DRAWINGS

FIG. 1 shows a block diagram of a MIMO radar sensor according to an example embodiment of the present invention.

DETAILED DESCRIPTION OF EXAMPLE EMBODIMENTS

FIG. 1 shows a simplified example of a MIMO radar sensor (FMCW radar), with an antenna array that includes two transmitting antenna elements TX and seven receiving antenna elements RX. Receiving antenna elements RX are offset relative to one another in a direction x, by equal distances in each case in the shown example. When direction x is the horizontal direction, the azimuth angle of the radar target may be measured (within certain accuracy limits) by comparing the phases of the signals that are received in the seven receiving antenna elements for a given radar target (in a certain distance cell and velocity cell). When direction x is the vertical direction, the elevation angle of the target may be correspondingly measured.

FIG. 1 symbolically illustrates a radar target Z that may be located by the radar sensor. In practice, target Z will have a considerable distance from the plane of the antenna array in the direction perpendicular to the plane of the drawing. As an example, it is assumed here that direction x is the horizontal direction, so that the radar sensor may measure the azimuth angle of target Z. In addition, it is assumed that the target is elongated in the vertical direction, so that the vertical offset, discernible in the drawing, between transmitting antenna elements TX on the one hand and receiving antenna elements RX on the other hand has no effect on the signal propagation lengths. The signal propagation lengths are thus determined solely by the offset of the antenna elements in direction x.

The two transmitting antenna elements TX are denoted by reference symbols T1 and T2 in order to make a clearer distinction between them. When transmitting antenna element T1 transmits a signal that is reflected at target Z and is then received by one of receiving antenna elements RX, the x component of the signal propagation path corresponds to the sum of the distance between transmitting antenna element T1 and target Z in direction x, and the distance between target Z and receiving antenna element RX in direction Z. In contrast, when the radar signal is transmitted via transmitting antenna element T2, not via transmitting antenna element T1, all signal propagation paths are reduced by the same amount, namely, by the distance between transmitting antenna elements T1 and T2.

In the drawing, the different signal propagation paths for all combinations of transmitting antenna elements and receiving antenna elements are represented by a virtual array VX. The first seven virtual antenna elements V1 through V7 are the same distance from target Z as real receiving antenna element RX, and thus represent the case that the signal is transmitted via transmitting antenna element T1. For the other virtual antenna elements, the distance from target Z is shortened, namely, by the distance between T1 and T2. These virtual antenna elements therefore correspond to the case that transmission is carried out via T2.

A special feature in the antenna array shown here is that transmitting antenna elements T1 and T2 are at the same distance from one another as first receiving antenna element R1 and last receiving antenna element R2 in the reception array. As a result, virtual antenna element V7 may be synthesized here in two different ways, namely, on the one hand by transmitting via T1 and receiving via R2, and on the other hand by transmitting via T2 and receiving via R1. Due to this "redundancy," virtual antenna array VX does not include 2×7=14 elements, but, rather, includes only a maximum of 13 elements, in the shown example 12 elements. Last virtual antenna element V12 therefore corresponds to the case that transmission is carried out via T2 and reception is carried out via the next to last receiving antenna element.

For generating the transmission signals and feeding them into transmitting antenna elements T1 and T2 as well as for processing the signals received in receiving antenna elements RX, in this example two separate chips C1 and C2 are provided, which may be MMICs, for example. Chip C1 feeds transmitting antenna element T1 and processes reception signals of the first four receiving antenna elements, beginning with first receiving antenna element R1 and ending with the fourth receiving antenna element, denoted here by reference symbol R0. Chip C2 feeds transmitting antenna element T2 and processes reception signals of the last four receiving antenna elements of R0 through R2. The output of receiving antenna element R0 is connected (or at least temporarily connectable) to both chips C1 and C2 via a power distributor.

A control and evaluation device D controls the operation of chips C1 and C2 and evaluates the signals received in the various reception channels. Transmitting antenna elements T1 and T2 are activated in alternation, so that the total of twelve virtual antenna elements may be measured in time multiplex. According to the FMCW principle, for each antenna element the received signal is downmixed into an intermediate frequency band, digitized, and recorded as a time signal over a measuring cycle. A fast Fourier transform is used to form from the time signal the spectrum in which each located target stands out as a peak at a frequency that is a function of the distance and the relative velocity of the target. Based on these data, the distance and the relative velocity of each located target are computed in a known manner. Angle information concerning the target is obtained by comparing the complex amplitudes of the signals that are obtained in the various virtual antenna elements for the same located target. For this purpose, the distribution of the complex amplitudes over the virtual antenna elements is compared to a previously measured and stored antenna diagram.

Certain phase delays occur in each of chips C1 and C2, in the transmission portion as well as in the reception portion. Since these signal delays may differ from chip to chip and may vary, for example as a function of the temperatures of the chips, this results in a phase difference between the two chips which must be computationally compensated for prior to the comparison to the antenna diagram. For this purpose, it is necessary to measure the phase difference between the two chips from time to time.

This measurement is made possible by the fact that virtual antenna element V7 is measured twice in each measuring cycle, namely, once using antenna combination T1, R2 and once using antenna combination T2, R1. When the signals obtained during these two measurements are compared, an overall phase difference DD is obtained which is independent of angle information of the located targets and which is made up of four portions:

$$DD = DT1 + DR2 - DT2 - DR1 = DELTA\_RX + DELTA\_TX \qquad (1),$$

where DT1 is a portion that originates from the signal delay in the transmission portion of chip C1, DR2 is a portion that originates from the signal delay in the reception portion of chip C2, DT2 is a portion that originates from the signal delay in the transmission portion of chip C2, and DR1 is a portion that originates from the signal delay in the reception portion of chip C1. The first two summands determine the overall signal delay when measurement is carried out using T1 and R2, and the other two summands correspondingly determine the overall signal delay when measurement is carried out using T2 and R1.

Virtual antenna element V4 corresponds to combination T1, R0. Since receiving antenna element R0 is connected to both chips, two signals, one from each of the two chips, are obtained for this antenna element. The phase difference between these two signals is equal to DR2−DR1, since the portions that originate from the signal delay in the transmission portion of transmitting chip C1 are equal for both signals. The measurement of this phase difference thus provides reception channel portion DELTA_RX of the overall phase difference.

Similarly, two signals are also obtained for virtual antenna element V10, which corresponds to combination T2, R0. These two signals could therefore also optionally be used for measuring DELTA_RX, or both methods are used for control purposes. When DELTA_RX=DR2−DR1 and DD are known, transmission channel portion DELTA_TX=DT1−DT2 may also be computed using equation (1).

By use of the two variables DELTA_RX and DELTA_TX, the error that is caused by the phase difference of the chips may be compensated for each pair of virtual antenna elements. When the phases of virtual elements V1 and V12, for example, are compared for the angle estimation, the correction value is DELTA_TX+DELTA_RX, since for V1, the transmission and reception are carried out using chip C1, whereas for V12, the transmission and reception are carried out using chip C2. In contrast, when the phases of virtual elements V1 and V6 are compared, in both cases the transmission signal originates from chip C1, and only the received signals are obtained from various chips, so that the correction value is DELTA_RX. In contrast, when the signals of virtual elements V5 and V11 are compared, in both cases reception is carried out using chip C2, but the transmitted signals originate from various chips, so that the correction value is DELTA_TX.

The determined correction values DELTA_TX and DELTA_RX are valid in each case for the phase relationships between all transmission channels or reception channels of the two chips C1 and C2. These correction values may also be applied to transmitting antenna and receiving antenna combinations, i.e., a virtual antenna element (not illustrated in FIG. 1).

The above-described principle may be generalized to antenna arrays that include a significantly larger number of transmitting antenna elements and receiving antenna elements, which may be offset horizontally as well as vertically, and for which three or more chips may possibly be necessary for activating the antenna elements. For example, if a total of three chips C1, C2, and C3 are present, there must be at least two receiving antenna elements that are connected analogously to receiving antenna element R0, and there must be at least two antenna configurations that correspond to the configuration of antenna elements T1, T2, R1, and R2. The phase differences may thus be measured for two pairs of chips, for example for C1, C2 and C2, C3. The phase difference for pair C1, C3 is then the sum of these phase differences, but optionally may also be measured directly when "divided" antenna elements corresponding to R0 and three various configurations analogous to T1, T2, R1, R2 are present in antenna array 3.

What is claimed is:

1. A MIMO radar sensor, comprising:
   an array of transmitting antenna elements and receiving antenna elements that are offset relative to one another in a predefined direction; and
   at least two electronic chips that are associated with different selections of the transmitting antenna elements and receiving antenna elements;
   wherein at least one receiving antenna element of the antenna elements is connectable to both of the chips, and the array includes at least one configuration of antenna elements that is made up of a first transmitting antenna element with which a first chip of the chips is associated, a first receiving antenna element with which the first chip is associated, a second transmitting antenna element with which a second chip of the chips is associated, and a second receiving antenna element with which the second chip is associated, and
   wherein a first offset between the transmitting antenna elements matches a second offset between the receiving antenna elements,
   wherein the transmitting antenna elements are activated in alternation, so that a number of virtual antenna elements is double a number of the transmitting antenna elements and are measured in a time multiplex.

2. The radar sensor as recited in claim 1, further comprising:
   a control and evaluation device configured to measure a phase difference between two signals that the chips simultaneously receive from the at least one receiving antenna element.

3. The radar sensor as recited in claim 2, wherein the control and evaluation device is configured to measure a phase difference between two signals, one of which is received by the second receiving antenna element when the first transmitting antenna element transmits, and the other of which is received by the first receiving antenna element when the second transmitting antenna element transmits.

4. The radar sensor as recited in claim 3, wherein the control and evaluation device is configured to compute, from the measured phase differences, correction values for the phase differences between virtual antenna elements of the array, and to make an angle estimation based on the corrected phase differences.

5. The radar sensor as recited in claim 1, wherein the at least two electronic chips include three electronic chips, wherein phase differences are measured for two pairs formed from the three electronic chips, and another phase difference for a third pair formed from the three electronic chips is a sum of all of the phase differences.

6. The radar sensor as recited in claim 1, wherein for each of the receiving antenna elements, a received signal is downmixed into an intermediate frequency band, digitized, and recorded as a time signal over a measuring cycle, and a fast Fourier transform is used to form from the time signal a spectrum in which a target stands out as a peak at a frequency that is a function of a distance and a relative velocity of the target.

7. The radar sensor as recited in claim 1, wherein a delta receiving variable and a delta transmitting variable are used to compensate, for each pair of virtual antenna elements, an error that is caused by a phase difference of the electronic chips.

8. The radar sensor as recited in claim 1, wherein the at least one receiving antenna element of the antenna elements is connectable to both of the chips via a power distributor.

* * * * *